(No Model.)
W. H. & J. J. MUSSELMAN.
ODOMETER.
No. 464,982. Patented Dec. 15, 1891.
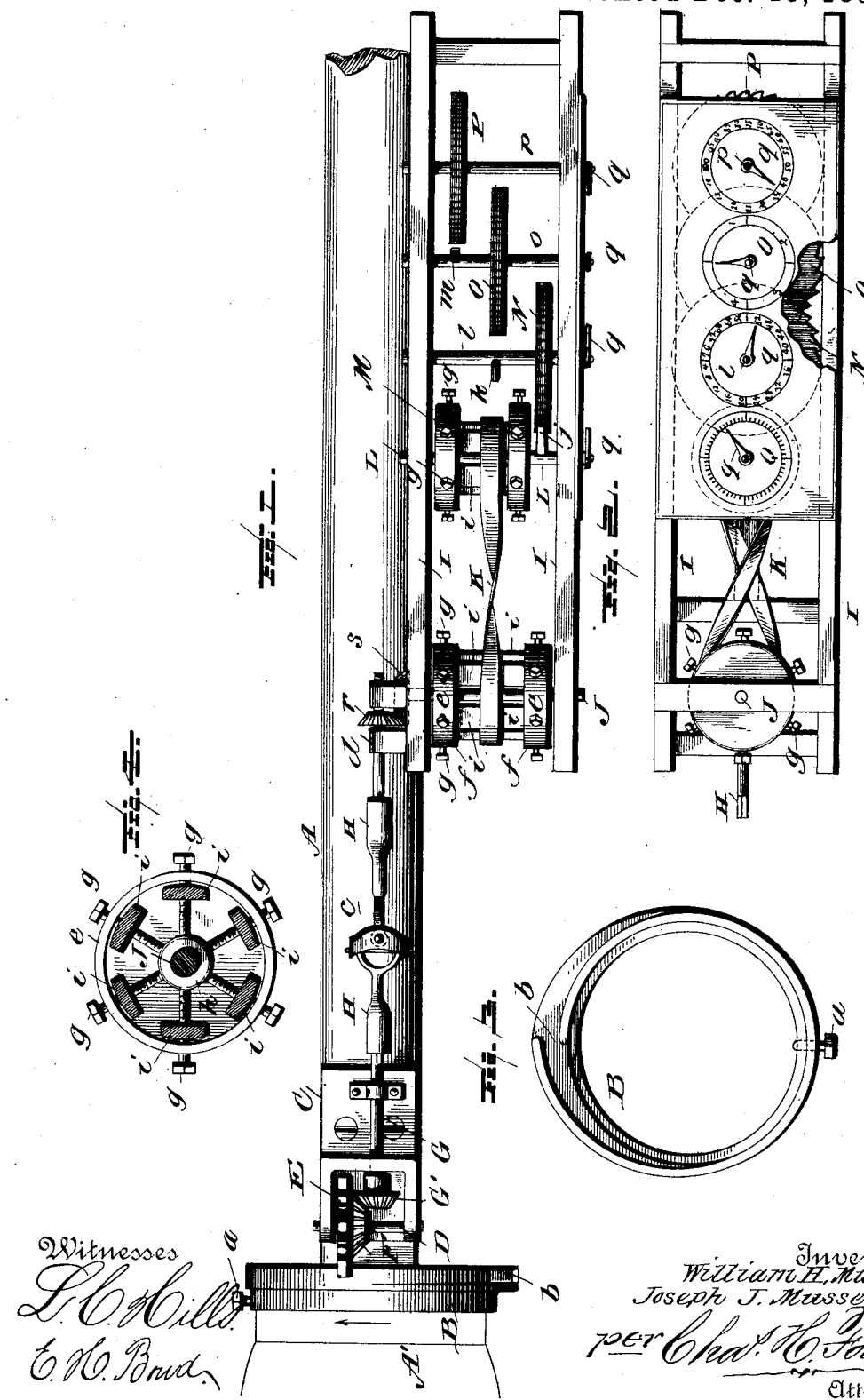
Witnesses
L. C. Hills.
E. H. Bond.
Inventors
William H. Musselman,
Joseph J. Musselman,
per Chas. H. Fowler
Attorney

UNITED STATES PATENT OFFICE.

WILLIAM H. MUSSELMAN AND JOSEPH J. MUSSELMAN, OF CHILI, INDIANA.

ODOMETER.

SPECIFICATION forming part of Letters Patent No. 464,982, dated December 15, 1891.

Application filed May 20, 1891. Serial No. 393,422. (No model.)

*To all whom it may concern:*

Be it known that we, WILLIAM H. MUSSELMAN and JOSEPH J. MUSSELMAN, citizens of the United States, residing at Chili, in the county of Miami and State of Indiana, have invented certain new and useful Improvements in Distance-Indicator Registers; and we do hereby declare that the following is a full, clear, and exact description of the same, reference being had to the annexed drawings, making a part of this specification, and to the letters of reference marked thereon.

This invention relates to certain new and useful improvements in indicators for registering the distance traveled by a certain object and which is applicable to shafts used for various purposes. It is specially designed and adapted for use upon road-vehicles, and will be so described in this specification.

The invention has for its objects, among others, to provide an improved device of this character which can be readily applied to a vehicle and which will automatically register the distance traveled thereby. We provide a cam or eccentric band designed to be attached to the hub of a wheel and a cog-wheel actuated by this cam or eccentric and connected through intermediate mechanism with the registering device. We provide novel means for proportioning the movement of the dials to the size of the wheel to which the device is attached or by which the device is operated.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1 is a top plan showing my improvement applied to a vehicle-wheel, the parts being on an enlarged scale and the axle broken away. Fig. 2 is a side view of the registering mechanism with a portion broken away. Fig. 3 is an inside view of the eccentric or cam band removed. Fig. 4 is a cross-section through one of the adjustable drums.

Like letters of reference indicate like parts throughout the several views in which they occur.

Referring now to the details of the drawings by letter, A designates a shaft, which in this instance is the axle of a vehicle of known construction, and A' is the wheel, or, rather, the hub of the wheel, in this instance the left-hand hind wheel, to the inner end of which the cam or eccentric band B is attached in any suitable manner—as, for instance, by the set-screw $a$. Attached to the hind axle is the plate C, which has suitable bearings for the shaft D at right angles to the axle, and which carries the spur-wheel E, which engages the cam or eccentric of the band B and is designed to be revolved one tooth at each revolution of the band, the eccentric being open, as shown at $b$. On this shaft D is a miter-wheel F, which revolves therewith and moves one tooth as the spur-wheel moves one tooth.

G is a shaft journaled in suitable bearings in the plate C and carrying at its outer end a miter-wheel G', meshing with the miter-wheel F, as shown in Fig. 1, so that its motion conforms to that of the spur-wheel and the miter-wheel F, as will be readily understood. The inner end of the shaft G is connected by means of a swivel joint or connection $c$ with a tumbling-rod H, the inner end of which is journaled in suitable bearings $d$ on the frame-work I, which carries the registering mechanism. In this frame-work or box I is journaled the shaft J, to which are attached the heads $e$ of the drum, which heads have annular inwardly-extending flanges $f$, through which pass the adjusting-screws $g$, which are screwed into the hub $h$ and to which are connected the blocks $i$, having curved outer faces, and which constitute the portion of the drum over which the belt K passes, as seen in Fig. 1. On a shaft L, parallel with the shaft J and journaled in the same frame or box, is another drum M, similarly constructed, the belt K passing over the two drums, as shown in Fig. 1, and being twisted, as shown. This adjustment of the drums is provided so that the movements of the dials, hereinafter described, shall be proportioned to the size of the wheel with which the device is employed. As the first drum is enlarged by the movement of the adjusting-screws the other is diminished, so as to keep the belt tight at all times. On the shaft L is a projecting pin $j$, which is designed to engage with a tooth of the toothed wheel N at each revolution of the said shaft. This toothed wheel is carried by a shaft $l$, journaled in the frame or box, and this shaft in turn is provided with a pin $k$, which engages once in each revolution of the shaft with a tooth of the toothed wheel O on the shaft $o$, journaled in the box, and this latter shaft carries a pin $m$, which in turn engages a tooth of the toothed wheel P on the shaft $p$, also journaled in the said box or frame. Each of the shafts L, $l$, $o$, and $p$ carries a pointer $q$, which works over the dials Q, which are graduated, as shown in Fig. 2. The first dial may designate feet and inches, the second yards and rods, the third miles, and the other hundreds of miles or any other desired distances.

Motion is conveyed from the shaft or tumbling-rod H to the shaft J by means of the interengaging bevel-pinions $r$ and $s$, the one on the shaft H and the other on the shaft J, as shown in Fig. 1.

The operation will be readily understood from the foregoing description, when taken in connection with the annexed drawings, and a detailed description thereof is not deemed necessary.

What we claim as new is—

1. The adjustable drum consisting of a hub, flanged heads thereon, adjusting-screws held in the flanges of the heads and the hub, and the curved pieces adjustable by the said screws and bearing against the inner faces of the heads, substantially as specified.

2. The combination, with the cam-band and the registering mechanism, of the spur-wheel arranged to be actuated by the said cam, the miter-wheels actuated from the spur-wheel, the tumbling-rod and swivel connection, the bevel-pinions revolved from the tumbling-rod, the drums, and the crossed belt passed around said drums, substantially as shown and described.

In testimony that we claim the above we have hereunto subscribed our names in the presence of two witnesses.

WILLIAM H. MUSSELMAN.
JOSEPH J. MUSSELMAN.

Witnesses:
JAMES M. BROWN,
H. P. LOVELAND.